United States Patent [19]

Blauch et al.

US005310002A

[11] Patent Number: 5,310,002
[45] Date of Patent: May 10, 1994

[54] GAS WELL TREATMENT COMPOSITIONS AND METHODS

[75] Inventors: Matthew E. Blauch; Tommy R. Gardner; Karen L. King; James J. Venditto, all of Duncan, Okla.

[73] Assignee: Halliburton Company, Duncan, Okla.

[21] Appl. No.: 870,546

[22] Filed: Apr. 17, 1992

[51] Int. Cl.$^5$ ............... E21B 43/22; E21B 43/26; E21B 43/27
[52] U.S. Cl. ................... 166/307; 166/305.1; 166/308; 166/309; 252/8.551; 252/8.553
[58] Field of Search ............ 166/305.1, 307, 308, 166/309; 252/8.551, 8.553

[56] References Cited

U.S. PATENT DOCUMENTS

| | | | |
|---|---|---|---|
| Re. 32,302 | 12/1986 | Almond et al. | 166/308 |
| 3,572,440 | 3/1971 | Hutchinson | 166/309 X |
| 3,937,283 | 2/1976 | Blauer et al. | 166/308 X |
| 4,453,596 | 6/1984 | Conway et al. | 166/308 X |
| 4,796,702 | 1/1989 | Scherubel | 166/309 X |
| 4,823,874 | 4/1989 | Ford | 166/279 |
| 4,913,237 | 4/1990 | Kutas | 166/308 |
| 4,981,601 | 1/1991 | Ford | 252/8.552 |
| 5,008,026 | 4/1991 | Gardner et al. | 252/8.553 |
| 5,034,140 | 7/1991 | Gardner et al. | 252/8.553 |

Primary Examiner—George A. Suchfield
Attorney, Agent, or Firm—Dougherty, Hessin, Beavers & Gilbert

[57] ABSTRACT

An additive for addition to conventional well treatment fluids to enhance the ability of the fluids to be recovered from subterranean formations, to generate a foam in association with the fluids and/or to enhance the ability of the fluids to remove water and other connate fluids interlocked with gas in the formations. The additive includes about 25% to about 50% by volume of a microemulsion generating component which forms an acid and/or water external microemulsion when added to the treatment fluid, and about 50% to about 75% by volume of a foaming agent component. The foaming agent component includes at least one nonionic surface active agent having an HLB of from 12 to 22. The additive is particularly suitable for addition to foam fracturing fluids useful for stimulating tight or otherwise unconventional gas formations. Also provided are a gas well treatment composition employing the inventive additive and a method of treating a subterranean formation in which the inventive composition is employed.

40 Claims, 2 Drawing Sheets

GAS WELL TREATMENT COMPOSITIONS AND METHODS

BACKGROUND OF THE INVENTION

1. Field of the Invention

This invention relates to compositions and methods for treating subterranean formations penetrated by well bores to stimulate the production of gas therefrom. In a primary embodiment, the invention relates specifically to foam treatment fluids and associated methods for treating/ stimulating gas producing formations.

2. Description of the Prior Art

Numerous compositions and methods have been developed for treating subterranean formations penetrated by well bores to stimulate the production of hydrocarbons therefrom. The compositions and methods typically function to improve the natural drainage pattern of the formations and/or remove barriers within the formations which prevent easy passage of reservoir fluids through the formations into the well bores.

Techniques commonly employed for stimulating production of hydrocarbons from subterranean formations include "acidizing" and "fracturing". Acidizing typically involves injecting an acid or aqueous acid solution into a formation to increase the size of existing pores and to etch new flow channels therein. Fracturing typically involves injecting an aqueous fluid into a formation under pressure and at a rate such that one or more fractures in the formation are produced. The acidizing or fracturing fluid is generally recovered from the formation s that it will not damage the formation or otherwise interfere with the production of hydrocarbons therefrom.

"Foam fracturing" is a specific type of fracturing technique. It can be carried out by generating a foam on the surface and then injecting the foam under pressure into the formation. The foam can be generated on the surface by combining, for example, nitrogen gas, water and a suitable foaming surfactant. Once the desired fracturing is achieved, pressure is released at the well head causing the foam to expand and come out of the well. Foam fracturing can also be carried out by generating a foam in situ in the formation. For example, U.S. Pat. No. Re. 32,302 discloses a foam fracturing method wherein a stabilized liquid-liquid emulsion formed with liquid carbon dioxide, an aqueous liquid and a selected surfactant is injected into the formation, the carbon dioxide is heated by the formation and a high quality stabilized foam is formed therein. Upon release of pressure, the foam breaks and the carbon dioxide gas exits the formation carrying associated liquids therewith.

Unfortunately, recovery of acidizing and fracturing treatment fluids from some formations is very difficult. Treatment fluids tend to rapidly fill the pore spaces of a formation matrix when contacted therewith. Many gas formations such as certain shale gas formations and coal bed methane ("CBM") formations have a naturally low permeability. These formations are typically associated with low temperatures (e.g., less than 200° F.) and low reservoir pressures (e.g., less than 1000 psi (bottom hole pressure)). High capillary forces within the pore spaces tend to hold treatment fluids therein.

Other formations are unconventional in other ways that make recovery of treatment fluids difficult. Formation characteristics such as low reservoir pressure and temperature, low porosity, low diffusivity, high fluid adsorption properties and/or inadequate wetting characteristics can prevent the treatment fluid from being expelled out of the pore spaces into the perforations, fractures and so forth that allow the fluid to flow back to the well bore.

Treatment fluids remaining in a formation, particularly a tight or otherwise unconventional formation, tend to saturate the formation and significantly affect the flow properties thereof. This kind of damage can seriously impair subsequent hydrocarbon production from the formation. For example, the permeability of some formations to gas present therein is decreased to a great extent following a stimulation treatment if substantially all of the treatment fluid is not recovered.

Also, in many formations, production of hydrocarbons is hindered by the presence of blocks of water and other connate fluids interlocked with gas in the formation. These "water blocks" also saturate the formation and impair subsequent recovery of hydrocarbons therefrom. For example, foreign fluids introduced into a gas producing formation reduce the relative permeability of the ga to liquid. Due to limited reservoir pressure and capillary forces tightly holding the fluids in the pore spaces previously occupied by the gas, blocks of the foreign fluids interlocked with gas cannot be removed from the formation by simply producing the well.

SUMMARY OF THE INVENTION

By the present invention, an additive has been developed that greatly enhances the ability of conventional well treatment fluids to be recovered from formations, particularly tight or otherwise unconventional gas producing formations, when admixed therewith. The additive also effectively generates foam in well treatment fluids when a gas component is admixed therewith. The enhanced ability of the fluids to be recovered reduces formation inhibition of the fluids and resulting formation damage, increases the relative mobility of gas in the formations and maximizes subsequent production of gas therefrom. The inventive additive also greatly enhances the ability of well treatment fluids in general including both acidizing fluids and fracturing fluids (foam and non-foam) to displace blocks of water and other connate fluids interlocked with gas in formations.

The additive is particularly useful for addition to gas well stimulation fluids to improve regain gas permeability following the treatment.

In one aspect, the invention provides an additive for addition to well treatment fluid. The well treatment fluid can be an acid, an aqueous acid solution or an aqueous non-acid solution. The additive comprises (a) about 25% to about 50% by volume of a microemulsion generating component which forms an acid and/or water external microemulsion when added to the treatment fluid, and (b) about 50% to about 75% by volume of a foaming agent component. The microemulsion generating component of the additive includes:

(i) an alkyl alcohol having in the range of from 4 to 18 carbon atoms;

(ii) a microemulsifying agent present in an amount sufficient to form and maintain a stable microemulsified dispersion of the alkyl alcohol in the acid and/or water external phase of the microemulsion;

(iii) a microemulsion mutual solvent selected from the group consisting of glycol ethers and alkoxylates of glycol ethers; and (iv) a microemulsion co-solvent selected from the group consisting of polyethylene glycol, primary alcohols and alkoxylates of alkyl alcohols.

Each of the components (i)–(iv) of the microemulsion generating component are different compounds or different mixtures of compounds. The foaming agent component of the additive includes at least one nonionic surface active agent having an HLB of from 12 to 22. If the foaming agent component includes a mixture of compounds, it is a different mixture of compounds than the mixture of compounds forming the microemulsion generating component.

In another aspect, the invention provides an acid and/or water external microemulsion well treatment composition. The composition comprises (a) about 90% to about 99.95% by volume of a treatment fluid selected from the group consisting of acid, an aqueous acid solution and an aqueous non-acid solution, (b) about 0.0125% to about 5% by volume of a microemulsion generating component, and (c) about 0.025% to about 7.5% by volume of a foaming agent component. The microemulsion generating component of the composition includes:

(i) an alkyl alcohol having in the range of from 4 to 18 carbon atoms microemulsified into the treatment fluid;

(ii) a microemulsifying agent present in an amount sufficient to form and maintain a stable microemulsified dispersion of the alkyl alcohol in the treatment fluid;

(iii) a microemulsion mutual solvent selected from the group consisting of glycol ethers and alkyoxylates of glycol ethers; and (iv) a microemulsion co-solvent selected from the group consisting of polyethylene glycol, primary alcohols and alkyoxylates of alkyl alcohols.

Each of the components (i)–(iv) of the microemulsion generating component are different compounds or different mixtures of compounds. The foaming agent component of the composition includes at least one nonionic surface active agent having an HLB of from 12 to 22.

In its primary embodiment, the inventive gas well treatment composition is a foam fracturing fluid for fracturing gas formations. The treatment fluid of the foam fracturing fluid is a base fracturing fluid (e.g., a propped solution of potassium chloride) and the composition includes a gas component (e.g., $N_2$, $CO_2$ or $N_2/CO_2$ commingle). The foaming agent component generates a foam in association with the gas component and base fracturing fluid, either on the surface or in situ in the formation depending on the type of base fracturing fluid, the type of gas component used and so forth.

In an alternate embodiment, the well treatment composition does not include a gas component and is for treating hydrocarbon bearing formations by techniques other than foam fracturing.

In all embodiments of the inventive well treatment composition, the treatment fluid (or base fracturing fluid), microemulsion generating component and foaming agent component, as well as the gas component and any additional separate components or mixtures of components employed, are preferably different compounds or different mixtures of compounds. For example, to the extent they are all mixtures of compounds, the treatment fluid, microemulsion generating component and foaming agent component are each preferably a different mixture of compounds. To the extent they all consist of a single compound, the treatment fluid, foaming agent component and gas component are each preferably a different compound.

In a third aspect, the invention provides a method of treating a subterranean formation to increase the production of hydrocarbons therefrom. The method includes the steps of contacting the formation with the well treatment composition described above in association with the second aspect of the invention, and recovering the well treatment composition from the formation.

In the primary embodiment of the method, the well treatment composition used in the method is the primary embodiment of the composition described above (a foam fracturing fluid) and the method is used to fracture gas formations.

The microemulsion generating component and foaming agent component of well treatment fluids in which the inventive additive is employed and the inventive well treatment composition (hereinafter "inventive compositions") synergistically function to enhance the ability of the compositions to be recovered from formations after the desired treatment is achieved. Gas wells treated with inventive compositions reach full production much faster than similar wells treated with conventional treatment fluids due to higher gas mobility following gas breakthrough and more efficient water recovery. The microemulsion generating component and foaming agent component of inventive compositions also function to enhance the ability of the compositions to remove any blocks of fluids interlocked with gas in formations. Furthermore, the foaming agent component generates a high quality, stable, foam if a gas component is employed in association therewith.

Although the invention is useful for treating oil and/or gas bearing formations including gas condensate reservoirs, it is particularly useful for treating unconventional gas formations such as formations having a relatively low permeability (e.g., less than 1.0 millidarcy). Examples of formations that tend to have a relatively low permeability and/or are unconventional for other reasons include coal bed methane ("CBM") formations, shale formations (e.g., Devonian shale, Antrim shale), clay bearing formations, sandstone formations, carbonate formations, siltstone formations, or any combination thereof. It has heretofore been very difficult or impossible to effectively recover foam fracturing and/or other treatment fluids from such formations.

The enhanced ability of inventive compositions to be recovered from formations allows formations to be treated without significantly altering the natural state thereof. Use of inventive compositions results in improved regain permeability to gas in the formations. The permeability of a formation treated with an inventive composition to gas present therein is at least as high as it was before the treatment was carried out. The ability of inventive compositions to remove blocks of fluid interlocked with gas in formations results in increased gas mobility in the formations and increased gas production therefrom.

The microemulsion generating component, foaming agent component and additional components of inventive compositions do not separate. Inventive compositions retain their multiphase flow properties during use which is particularly important in applications such as matrix stimulation treatments where separation would render the components ineffective in their discrete phases.

It is, therefore, a principal object of the invention to provide an additive for addition to a well treatment fluid that effectively generates a foam, enhances the ability of the treatment fluid to be recovered from a subterranean formation and/or enhances the ability of the treatment fluid to remove blocks of water and other connate fluids trapped by gas in the formation.

It is also a principal object of the invention to provide a well treatment composition and method that employ the inventive additive.

Numerous other objects, features and advantages of the present invention will be readily apparent to those skilled in the art upon a reading of the following disclosure including the examples provided therewith.

DESCRIPTION OF THE PREFERRED EMBODIMENTS

As described above, the present invention provides an additive for addition to a well treatment fluid. The invention also provides a well treatment composition employing a treatment fluid and the inventive additive and a method of treating a subterranean formation to increase the production of hydrocarbons therefrom in which the inventive well treatment composition is employed.

I. The Additive

The inventive additive is suitable for addition to all types of conventional well treatment fluids including straight acid fluids, aqueous acid solutions and aqueous non-acid solutions. As used herein and in the appended claims, an aqueous non-acid solution means an aqueous solution not having acid characteristics, i.e. not having a pH below 7. Examples of aqueous non-acid solutions include neutral and basic hydraulic fracturing fluids and pure water. The type of treatment fluid used depends on the type of treatment and end result desired, well conditions and other factors known to those skilled in the art. The inventive additive is particularly suitable for addition to an aqueous base fracturing fluid and a gas component to form a foam fracturing fluid.

The additive preferably comprises about 25% to about 33% by volume of the microemulsion generating component and about 67% to about 75% by volume of the foaming agent component. Most preferably, the additive comprises about 33% by volume of the microemulsion generating component and about 67% by volume of the foaming agent component. As used herein and the appended claims, the % by volume of a particular component in the inventive additive, in the inventive composition or in a separate component thereof means the % by volume of the particular component based on the total volume of the referenced inventive additive, inventive composition or separate component thereof.

(A) The Microemulsion Generating Component

When the additive is added to a well treatment fluid, the microemulsion generating component forms an acid and/or water external microemulsion with the alkyl alcohol (component (i) of the microemulsion generating component as set out above in the summary of the invention) microemulsified into the acid and/or water phase. Thus, the microemulsion generating component makes the treatment fluid to which the inventive additive is added a two-phase fluid.

The alkyl alcohol (component (i)) of the microemulsion generating component preferably has 4 to 10 carbon atoms. Examples of preferred alkyl alcohols (component (i)) include butanol, isobutanol, pentanol, isopentanol, hexanol, octanol and isooctanol. Most preferably, the alkyl alcohol (component (i)) has 8 carbon atoms. The alkyl alcohol (component (i)) functions to partition at the interface of immiscible fluids to provide approximately zero interfacial tension.

The alkyl alcohol (component (i)) of the microemulsion generating component is preferably present in the microemulsion generating component in an amount in the range of from less than 1% to about 50% by volume of the microemulsion generating component. More preferably, the alkyl alcohol (component (i)) is present in the microemulsion generating component in an amount in the range of from about 5% to about 25%, even more preferably from about 10% to about 18%, by volume of the microemulsion generating component.

The microemulsifying agent (component (ii)) of the microemulsion generating component can be nonionic, cationic, anionic or amphoteric as long as a hydrophilic/lipophilic balance ("HLB") sufficient to obtain a stable micro dispersion of the alkyl alcohol (component (i)) in the acid and/or water phase is achieved. As used herein and the appended claims, the HLB of a surface active agent is the HLB of the agent as determined by the weight balance of hydrophilic and lipophilic components comprising the surface active agent. The HLB of a surface active agent relates to the solubility of the agent. Examples of suitable microemulsifying agents (component (ii)) include ethoxylated alcohols, esters, alkyl sulfonates, alkyl phosphates, carboxylated-ethoxylated tallow amines, betaine compounds and mixtures thereof. Preferably, the microemulsifying agent (component (ii)) is selected from the group consisting of ethoxylated alcohols, ethoxylated nonylphenols and betaine compounds. More preferably, the microemulsifying agent (component (ii)) is an ethoxylated nonylphenol, most preferably an ethoxylated nonylphenol ethoxylated with approximately 20 moles of ethylene oxide. A particularly suitable microemulsifying agent (component (ii)) is a blend comprising about 70% by weight nonylphenol ethoxylated with approximately 20 moles of ethylene oxide, about 7% by weight ethylene glycol, about 5% by weight methanol and water (hereinafter "the preferred microemulsifying agent blend").

The microemulsifying agent (component (ii)) is preferably present in the microemulsion generating component in an amount in the range of from less than 1% to about 50% by volume of the microemulsion generating component. More preferably, the microemulsifying agent (component (ii)) is present in the microemulsion generating component in an amount in the range of from about 1% to about 25%, even more preferably from about 10% to about 18%, by volume of the microemulsion generating component. The microemulsifying agent (component (ii)) functions to form and maintain a stable microemulsified dispersion of the alkyl alcohol (component (i)) in the acid and/or water phase.

The microemulsion mutual solvent (component (iii)) of the microemulsion generating component is preferably a glycol ether. Most preferably, the microemulsion mutual solvent (component (iii)) is ethylene glycol monobutyl ether (EGMBE). The microemulsion co-solvent (component (iv)) of the microemulsion generating component is preferably an alkyl alcohol selected from the group consisting of an alkyl alcohol having 6 carbon atoms and an alkyl alcohol having 7 carbon atoms, the alkyl alcohol being ethoxylated with 2 moles of ethylene oxide. Most preferably, the microemulsion co-solvent (component (iv)) is an alkyl alcohol having 7 carbon atoms and ethoxylated with 2 moles of ethylene oxide. The microemulsion mutual solvent (component (iii)) and co-solvent (component (iv)) are preferably employed in the microemulsion generating component in approximately equal amounts. A primary function of the microemulsion mutual solvent (component (iii)) is to make otherwise insoluble chemicals soluble in the acid and/or water phase. The mutual solvent also reduces the tendency of the microemulsifying agent and foaming agent component to be absorbed by the formation. A primary function of the microemulsion co-solvent (component (iv)) is to enhance the performance of the mutual solvent and to aid in the formation and maintenance of a stable microemulsified dispersion of the alkyl alcohol (component (i)) in the acid and/or water phase. The mixture of the microemulsion mutual solvent (component (iii)) and co-solvent (component (iv)) interacts with the microemulsifying agent or agents employed (component (ii)) and affects the concentrations of the alkyl alcohol (component (i)) that can be microemulsified.

If desired, the microemulsion mutual solvent (component (iii)) and microemulsion co-solvent (component (iv)) of the microemulsion generating component can be a pre-formulated blend. A particularly suitable pre-formulated microemulsion mutual solvent/co-solvent blend and the microemulsion mutual solvent/co-solvent blend most preferred at the present time comprises about 50% by volume ethylene glycol monobutyl ether (EGMBE) and about 50% by volume of a mixture of alkyl alcohols having 6 to 7 carbon atoms and ethoxylated with 2 moles of ethylene oxide (hereinafter "the most preferred microemulsion mutual solvent/co-solvent blend").

The microemulsion mutual solvent (component (iii)) and microemulsion co-solvent (component (iv)) of the microemulsion generating component are each preferably present in the microemulsion generating component in an amount in the range of from about 1% to about 50%, more preferably in the range of from about 20% to about 50%, by volume of the microemulsion generating component. Even more preferably, the microemulsion mutual solvent (component (iii)) and microemulsion co-solvent (component (iv)) are each present in the microemulsion generating component in an amount in the range of from about 32% to about 40% by volume of the microemulsion generating component. The microemulsion mutual solvent and microemulsion co-solvent combined are preferably present in the microemulsion generating component in an amount in the range of from less than 1% to about 90%, most preferably in the range of from about 64% to about 80%, by volume of the concentrate.

At this time, the microemulsion generating component of the inventive additive most preferably comprises about 14.5% by volume 2-ethyl hexanol, about 14.5% by volume of the preferred microemulsifying agent blend described above and about 71% by volume of the most preferred microemulsion mutual solvent/co-solvent blend described above.

A preferred embodiment of the microemulsion generating component of the inventive additive is described in U.S. Pat. No. 5,008,026 to Gardner et. al., the full disclosure of which is incorporated by reference herein.

(B) The Foaming Agent Component

The foaming agent component of the inventive additive functions to form a high quality foam in association with an aqueous treatment fluid and a suitable gas component. As described above, the foaming agent component also functions together with the microemulsion generating component to enhance the ability of treatment fluids to be recovered from formations and to remove "fluid blocks" trapped in formations. The nonionic character of the foaming agent component imparts wetting characteristics to the additive which are important to leave the formation in a natural or preferably water wet condition. The 12–22 HLB of the surface active agent(s) forming the foaming agent component is important to assure the foaming agent component is soluble in the well treatment fluid.

Examples of commercially available nonionic surface active agents having an HLB of from 12 to 22 and suitable for use in the forming the foaming agent component of the inventive additive include the following:

| HLB | TRADE NAME | CHEMICAL DESCRIPTION |
| --- | --- | --- |
| 12–13 | "Norfox NP-7" | 7.5 mole ethoxylated nonylphenol |
| 12–18 | "Pluronic ® L-10" | Block copolymer of propylene oxide and ethylene oxide |
| 12–18 | "Pluronic ® P-85" | Block copolymer of propylene oxide and ethylene oxide |
| 12 | "Alfonic ® 1012-60" | Ethoxylated linear alcohols (60% E.O.) |
| 12.1 | "Tergitol ® 15-S-7" | $C_{11}$–$C_{15}$ secondary alcohol ethoxylate |
| 13.0 | "Igepal CO-630" | Nonylphenoxypoly (ethyleneoxy) ethanol |
| 13.5 | "Alkaminox T-12, 90%" | Tertiary amines; ethoxylates of primary tallow amines |
| 14.2 | "T-DET C-20" | Polyethoxylated castor oil |
| 14.3 | "Trymeen 6606" | Ethoxylated tallow amine |
| 14.4 | "Genapol ® 26-L-98N" | $C_{12}$–$C_{16}$ natural linear alcohol ethoxylated to 98° C. cloud point (approx 11.5 mole) with a narrow range EO distribution |
| 14.4 | "Tergitol ® NP-13" | Ethoxylated nonylphenol |
| 14.5 | "Tergitol ® 15 S-12" | $C_{11}$–$C_{15}$ secondary alcohol ethoxylate |
| 14.6 | "Norfox OP-102" | Ethoxylated octyl phenol |
| 14.9 | "Alkamuls PSMS-20" | Polyoxyethylene sorbitan (20) |
| 15.0 | "Tergitol ® NP-15" | Ethoxylated nonylphenol |
| 15.3 | "Brij 78" | Polyoxyethylene (20) stearyl ether |
| 16.0 | "Pegol P 84" | Alkoxylated glycols |
| 16.0 | "Trycol 5946" | Ethoxylated tridecyl ethers |
| 16.7 | "Dowfax 2EP" | Sodium dodecyl diphenyloxide disulfonate |
| 16.7 | "Trycol 5877" | Ethoxylated lauryl alcohol Ethoxylated fatty alcohol |
| 17.0 | "Hetoxide NP-30" | Ethoxylated (30) nonyl phenol |

| HLB | TRADE NAME | CHEMICAL DESCRIPTION |
| --- | --- | --- |
| 17.0 | "Iconol NP-30" | Ethoxylated alkyl phenol (nonyl) |
| 17.0 | "Iconol NP-30-70" | Ethoxylated alkyl phenol (nonyl) |
| 17.0 | "Iconol OP-30" | Ethoxylated alkyl phenol (octyl) |
| 17.0 | "Iconol OP-30-70%" | Ethoxylated alkyl phenol (octyl) |
| 17.1 | "Aklasurf NP-30, 70%" | Nonylphenol ethoxylate |
| 17.2 | "Igepal CO-887" | Nonylphenoxypoly (ethyleneoxy) ethanol |
| 18.0 | "Pegol F 88" | Alkoxylated glycols |
| 18.0 | "T-DET-D-70" | Dinonylphenol-70 moles ethylene oxide |
| 18.7 | "Alkasurf OP-70, 50%" | Octyl phenol ethoxylate |
| 19.0–20.0 | "Ethomid HT60" | Polyethyloxylated (50) hydrogenated tallow amide |
| 19.0 | "Veronic L1-420" | Ethoxylated mono- and diglyceride |
| 19.0 | "T-DET N-1007" | Ethoxylated nonyl phenol (number indicates moles of ethylene oxide) |
| 20.0 | "Norfox PE-LF" | Ethoxylated alcohol phosphate |

Other suitable nonionic surface active agents having an HLB of from 12 to 22 are listed in *McCutcheon's Emulsifiers and Detergents*, N. American Ed., Vol. 1, 1991.

The foaming agent component preferably includes at least one nonionic surface active agent selected from the group consisting of alkoxylated branched chain alcohols, and propylene oxide condensate block polymers. The foaming agent component more preferably includes at least one compound selected from the group consisting of alkoxylated nonylphenols having an HLB of from 14 to 20, and alkyoxylated linear and branched chain alcohols having an HLB of from 14 to 20. Even more preferably, the foaming agent component is a nonyl phenol ethoxylated with in the range of about 15 moles to about 100 moles of ethylene oxide. Most preferably, the foaming agent component is a nonylphenol ethoxylated with about 20 moles of ethylene oxide.

The inventive additive is preferably added to the well treatment fluid in an amount in the range of from about 0.5 to about 50 gallons, more preferably about 1 to about 20 gallons, per 1000 gallons of the treatment fluid. When the treatment fluid is a foam fracturing fluid, the inventive additive is typically very effective when admixed therewith at a concentration of about 5 gallons per 1000 gallons of the fracturing fluid. Lower concentrations of the additive can be used to achieve downhole foaming in areas where adsorption of surface active agents is not a concern.

II. The well Treatment Composition

The exact amounts of the components and the type of treatment fluid employed in the inventive acid and/or water external microemulsion well treatment composition depend on the type of treatment and end result desired, well conditions and other factors known to those skilled in the art. The inventive well treatment composition preferably comprises about 98% to about 99.9% by volume of the aqueous treatment fluid, about 0.025% to about 1% by volume of the microemulsion generating component and about 0.05% to about 1.5% by volume of the foaming agent component. More preferably, the inventive well treatment composition comprises about 99.5% by volume of the treatment fluid, about 0.165% by volume of the microemulsion generating component and about 0.33% by volume of the foaming agent component.

In general acidizing applications (matrix acidizing and general well bore clean-out), certain foam and non-foam fracturing applications (gelled and non-gelled) and other applications such as acid breakdown treatments and treatments to remove trapped water and other connate fluids, drilling mud, completion fluids and/or other damaging fluids, it is useful to employ straight acid or an aqueous acid solution as the aqueous treatment fluid of the inventive treatment composition. Acids suitable include both mineral acids and organic acids such as hydrochloric acid, hydrofluoric acid, acetic acid, nitric acid, formic acid, phosphoric acid, hypophosphorous, ethylenediaminetetraacetic acid, nitrilotriacetic acid and mixtures thereof in concentrations ranging from 0.1 volume percent and up. Foamed acid solutions can be generated up to about 270° F.

In other foam and non-foam fracturing applications (gelled and non-gelled) and other applications such as nonreactive matrix treatments to remove trapped water and other connate fluids and other damaging fluids, it is useful to employ an aqueous non-acid solution as the treatment fluid of the inventive treatment composition. Examples of aqueous non-acid solutions that can be employed include alcohol-water mixtures with or without a gas component and ammonium chloride, potassium chloride and salt substituted solutions. Use of concentrated brine solutions (e.g., water base fluids weighted with calcium chloride, sodium bromide and zinc chloride in weights in excess of 10 pounds per gallon) as the treatment fluid of the inventive composition should be avoided due to insufficient solubility of the remaining components of the inventive composition therein. Use of liquid hydrocarbon based fluids should also be avoided although the fluid can include limited amounts of liquid hydrocarbons (e.g., oil based liquid gelled concentrates).

As discussed in the summary of the invention above, in its primary embodiment, the inventive treatment composition is a foam fracturing fluid that includes a gas component. The treatment fluid is a base fracturing fluid. The foaming agent component effectively generates a high quality, stable foam in the presence of the base fracturing fluid and gas component. Recovered fluid has excellent foam regeneration characteristics. Preferably, the base fracturing fluid is selected from the group consisting of ammonium chloride solutions, calcium chloride solutions, potassium chloride solutions and salt substitute solutions (e.g., organic metal halides). Most preferably, the base fracturing fluid is a solution consisting of 2% by weight of potassium chloride, ammonium chloride or a salt substitute.

The gas component of foam fracturing fluids formed in accordance with the invention is preferably selected from the group consisting of nitrogen gas ($N_2$), carbon dioxide ($CO_2$) and commingled $N_2$ and $CO_2$. Nitrogen gas is typically used when dealing with low pressured reservoirs that cannot sustain the hydrostatic head of a column of fluid. Carbon dioxide is typically used in place of nitrogen to achieve lower wellhead treating pressures or when desirable from a fluid-rock compatibility standpoint. Most preferably, the gas component is nitrogen. The amount of the gas component employed depends on the type of gas component, the specific foaming agent component, the quality of foam desired, formation conditions, reservoir temperature and pressure and other factors known to those skilled in the art. Preferably, the gas component is employed in an amount such that a stable foam is produced and the reduced hydrostatic head will allow for better fluid returns.

If desired, foam fracturing fluids formed in accordance with the invention can include gelling agents for additional stability, additional foam generating components, proppant material and the like. For example, proppant material can be used to keep the fractures open once they are formed.

Suitable gelling agents include hydroxyethyl cellulose (HEC), carboxymethyl hydroxyethyl cellulose (CMHEC), carboxymethyl hydroxy propylguar (CMHPG), hydroxy propylguar (HPG), guar, xanthan, crosslinkable HEC and acrylamide polymers. The gelling agent or agents are preferably used in an amount of about 0.125% to about 1.25% by weight based on the weight of the treatment fluid.

Examples of proppant material that can be employed include sand, graded gravel, glass beads, sintered bauxite, resin-coated sand, ceramic proppant and so forth. The amount of proppant material employed depends on the type of formation and fracture half length that is desired. Generally, the proppant material is employed in an amount of about 0.25 pound to about 28 pounds per gallon of the base fracturing fluid used.

Various additives such as emulsion preventors, biocides, crosslinkers, gel breakers, pH adjusters, clay stabilizers, methanol, paraffin inhibitors, iron control additives, fluid loss additives, friction reducers, anti-sludging additives, corrosion inhibitors and other additives known to those skilled in the art can be effectively employed with the inventive well treatment composition. Of course, the specific additive or additives employed will depend on the nature of the treatment, the exact nature of the composition, the type of formation and so forth.

The Inventive Method

In accordance with the inventive method, the inventive well treatment composition is introduced into the formation by way of the well bore. The microemulsion generating component and foaming agent component (the inventive additive — preferably premixed) can be admixed with the aqueous treatment fluid and other components employed at the well site in a suitable blender, batch mixer or the like.

For example, if the composition is a foam fracturing fluid, the base fracturing fluid and other components employed can be admixed together in a blender at the well site. The inventive additive can be added to the fluid on the discharge side of the blender. A gas component (e.g., nitrogen) can be added further downstream into a "T" connector or manifold. A foam generator may or may not be used as a shearing device depending on the rate at which the fracturing fluid is to be pumped. The foam fracturing fluid is injected into the formation through the wellbore. Acid breakdowns, prepads (foamed or non-foamed) and the like as known to those skilled in the art can be employed. Once the foam fracturing fluid is injected into the formation, the well can be shut in for a short period of time, typically less than 4 hours, so that the ga will not dissipate into the formation.

If the composition is an acidizing fluid, the acid and other components employed are premixed and stored in a tank. The inventive additive can be added to this mixture as the mixture is pumped into the wellbore. Alternatively, the acid and all other components employed including the inventive additive can be batch mixed at the same time and then injected into the formation.

Once the inventive treatment composition has achieved its objective, it is recovered from the formation together with any material dissolved and so forth. For example, if the composition is a foamed fracturing fluid, it is recovered by holding back pressure on the reservoir (e.g., surface choke) and producing the fluid back leaving any proppants in the formation. The choke size will depend on the amount of fluid being produced back and also the amount of back pressure needed to keep the fluid producing. If the composition is a general non-foam matrix treatment fluid, it is recovered by swabbing, gas assist, jetting or allowing reservoir pressure to produce the injected fluids. As shown by the examples below, substantially all of the inventive well treatment composition employed in the inventive method can be recovered in a relatively short period of time, even in tight or otherwise unconventional formations.

EXAMPLE I

Devonian shale Core Tests

A laboratory experiment was developed and performed to analyze the effects of various treatment fluids on the permeability of inherently tight (less than one millidarcy) formation cores to gas.

The formation cores used in the tests were taken from the lower Huron member of a Devonian shale formation in West Virginia. Devonian shale formations typically have relatively low natural permeabilities and are associated with relatively low reservoir pressures (e.g., less than 1000 psi) and low reservoir temperatures (e.g., 100° F.).

The cores were obtained and prepared for the tests as follows. Whole cores were taken from the formation by using air mist as the coring fluid and an aluminum inner liner core barrel device known to those skilled in the art of coring. Core plugs were then obtained from the whole core by drilling core plugs using the nitrogen as the coolant in order to preserve the core's natural state. Each core plug used for testing weighed around 25 grams, had a length of approximately 1 inch and had a diameter of approximately 1 inch. Core plug samples were also obtained through rotary sidewall drilling whereby a core plug was directly obtained from the wellbore wall. The cores were prepared for the tests by shaving the ends of the core plugs using a sharp blade to remove core-end damage and plugging debris created during the sawing process. Sawing was performed using a diamond core saw blade cooled with carbon dioxide.

Each core sample was tested utilizing the following basic procedure. The core sample was first wrapped with one layer of teflon tape and placed within a Hassler sleeve. A Hassler sleeve is a device that can be used to seal the perimeter of a core sample and allow for the application of hydraulic confining stress radially around the core and axial stress to the core ends through mechanical and/or hydraulic means, as known to those skilled in the art. In this experiment, the Hassler sleeve functioned to both seal gas and liquid flow around the core perimeter in order to simulate downhole confining stress.

Once the core sample was in place in the Hassler sleeve, hydraulic fluid was pumped into the Hassler sleeve through a port thereof to load the core with a radial hydraulic pressure of approximately 1200 psi. This pressure served as an approximation of the average stress of the rock experienced in this low permeability, low pressure reservoir. The hydraulic fluid used was a water dyed with fluorescence to check for possible leaks using ultraviolet light.

Next, nitrogen gas ($N_2$) was introduced into the Hassler sleeve through an end thereof under an upstream steady pressure of approximately 100 psi and allowed to flow through the core. The downstream flow rate of the nitrogen gas (cc/sec), the barometric pressure, the temperature and the upstream gauge pressure were periodically measured as the nitrogen gas flowed through the core and the permeability of the core to the nitrogen gas (hereinafter "the $N_2$ permeability of the core") calculated based thereon until the $N_2$ permeability of the core achieved a relatively steady state. The $N_2$ permeability of the core was presumed to achieve a relatively steady state at some value of irreducible connate fluid saturation. The relatively steady state $N_2$ permeability of the core represented the initial (native state) $N_2$ permeability of the core.

The downstream flow rate of the nitrogen gas was measured using a traveling oil meniscus flow meter located downstream of the outlet end of the core. A traveling oil meniscus flow meter is a flow meter device useful for accurately determining very low flow rates. It consists of a horizontally aligned capillary tube filled with an indicator oil. The smallest tube has a volume of 1/10 ml with an increment of 1/1000 ml. The time it takes the oil to travel through the capillary tube is used to calculate the flow rate. The barometric pressure was measured (in mm Hg) using a mercury barometer located in the test facility room. The upstream gauge pressure was measured using a calibrated high resolution pressure gauge located upstream of the core. The $N_2$ permeability of the core sample was calculated based on Darcy's Law using the downstream flow rate of the nitrogen gas, the barometric pressure, the gas viscosity (correction made based on temperature (F); the upstream gauge pressure and sample dimensions in accordance with the following equation:

$$K_{md} = \frac{2000 B Q \mu}{[(P_{ug} + B)^2 - B^2](A/L)}$$

WHERE:
K = permeability in millidarcies
B = barometric pressure, atms.
Q = gas flow rate @ B in cc/sec
$\mu$ = gas viscosity in cps
L = sample length in cm
A = sample cross sectional area in sq cm
$P_{ug}$ = upstream gauge pressure in atms

FOR EXAMPLE, $$K_{md} = \frac{2000 B Q \mu}{[(P_{ug} + B)^2 - B^2](A/L)}$$

Assume:
Q = 1.0 × 10$^{-5}$ cc/sec
$P_{ug}$ = 100 psig/14.696 = 6.8046 Atm
B = 27.65 in Hg (barometric pressure) = 27.65/29.921 = 0.9281 atm
$\mu$ = 0.018325 cps (nitrogen)
L = 2.54 cm
D = 2.54 cm
A = 5.0671 cm$^2$ then:

$$K_{md} = \frac{2000(0.9281 \text{atm})(1.0 \times 10^5 \text{ cc/sec})(0.018325 \text{ cps})}{[(6.8046 \text{Atm} + 0.9281 \text{atm})^2 - (0.9281 \text{atm})^2](5.0671 \text{cm}^2/2.54 \text{ cm})}$$

$$K_{md} = 2000 \frac{(1.7007 \times 10^{-7})}{[(7.7327)^2 - (0.9281)^2](1.995)} = \frac{2000(1.7007 \times 10^{-7})}{117.572}$$

$$K = 2.893 \times 10^{-6} \text{ md} = 2.893 \times 10^{-3} \text{ micro darcies}$$

Once the initial (native state) $N_2$ permeability of the core was determined, the core was saturated with the first treatment fluid to be tested. The treatment fluid was pumped into the core through an end of the Hassler sleeve under either a constant pressure (e.g., 500 psi) or a constant flow rate (e.g., 1 cc/min.). The constant pressure, constant flow rate and fluid metering were achieved using an ISSCO MODEL 500 D programmable syringe pump. The treatment fluid was pumped into the core until it was determined that the core was fully saturated therewith. It was determined that the core was fully saturated with the treatment fluid when fluid breakthrough occurred followed by stable permeability response to fluid injection.

After the core was fully saturated with the treatment fluid, nitrogen gas flow through the core from the end of the Hassler sleeve was re-started. The nitrogen gas was initially introduced into the core at a constant upstream pressure (e.g., 500 psi) to simulate reservoir displacement pressure. This pressure was held for approximately 60 to 120 minutes and then lowered to approximately 100 psi, the pressure at which the initial $N_2$ permeability of the core was determined. The nitrogen gas was continuously introduced into the core at approximately 100 psi for long periods of time (e.g., 30 days) to insure that a steady state flow and equilibrium values were obtained and to evaluate long term cleanup response of the test fluid on the gas permeability of the core sample. The downstream flow rate of the nitrogen gas, the barometric pressure, the temperature and the upstream $N_2$ pressure were measured and the $N_2$ permeability of the core calculated based thereon periodically throughout the test period in accordance with the above procedures and equation. The nitrogen gas flow was generally discontinued and this portion of the test terminated when no change or improvement in permeability was observed.

Comparison of the $N_2$ permeability of the core sample (at 100 psi) immediately following saturation of the core sample with the treatment fluid to the initial $N_2$ permeability of the core sample (at 100 psi) shows the reduction in the $N_2$ permeability of the core sample (at 100 psi) caused by the treatment fluid. The $N_2$ permeability of the core (at 100 psi) following saturation with the treatment fluid and after having nitrogen gas flow therethrough for a significant period of time demonstrates the ability of the treatment fluid to be recovered from the core sample and the rate at which such recovery can be achieved.

In some tests, the core sample was saturated with an additional treatment fluid to see if the initial $N_2$ permeability of the core sample would be restored. These tests were carried out in the same manner thereby described above.

Test No. 1

The core sample used in the first test was obtained from a core removed from the formation at a depth of 5,202 feet. The treatment fluid initially used to saturate the core sample (hereinafter "test fluid no. 1A") was a brine solution, an aqueous solution containing 2 percent by weight potassium chloride (KCl). After the core sample was saturated with test fluid no. 1A, the $N_2$ permeability of the core sample was periodically determined over a 16-day period. As discussed further below, the $N_2$ permeability of the core sample was greatly reduced by this treatment fluid and was not restored over time.

In order to investigate the ability of methanol to restore the $N_2$ permeability of the core sample, the core sample was saturated with a solution containing 70 percent by weight methanol (hereinafter "test fluid no. 1B") and nitrogen gas flow through the sample was started back up. The $N_2$ permeability of the core sample was then determined over a 28-day period.

The initial $N_2$ permeability of the core sample together with the $N_2$ permeability of the core sample at various stages of the above test are shown by TABLE I below.

TABLE I

| $N_2$ Endpoint Permeabilty* - Devonian Shale (Test No. 1) | |
|---|---|
| Test Stage Test No. 1 Core | Permeability (Microdarcies) |
| A) Native State[1] | 333.53 |
| B) After test fluid no. 1A (16 days)[2] | 4.54 |
| C) After test fluid no. 1B (1 day)[3] | 1.07 |
| D) After test fluid no. 1B (27 days)[4] | 9.04 |

*The test was carried out at a reference upstream gas pressure of 100 psi. The maximum upstream gas pressure during the test was 300 psi.
[1]The initial $N_2$ permeability of the core (before saturation with test fluid no. 1A)
[2]The $N_2$ permeability of the core after 16 days of $N_2$ flow following saturation with test fluid no. 1A.
[3]The $N_2$ permeability of the core after 1 day of $N_2$ flow following saturation with test fluid no. 1B (after saturation with test fluid no. 1A).
[4]The $N_2$ permeability of the core after 27 days of $N_2$ flow following saturation with test fluid no. 1B (after saturation with test fluid no. 1A).

TABLE I shows that the initial (native state) $N_2$ permeability of the core was relatively high. The KCl solution (test fluid no. 1A) drastically reduced the $N_2$ permeability of the core and did not show any cleanup-response with time. Saturation of the core with the concentration methanol solution (test fluid no. 1B) initially lowered the $N_2$ permeability of the core even further. Although the $N_2$ permeability of the core slightly increased after 27 days of $N_2$ flow, it was not restored to even close to its original level.

Tests Nos. 2 and 3

The core samples used in the second and third tests were obtained from a core removed from the formation at a depth of approximately 4,815 feet. The treatment fluids used to saturate the cores in these tests were gelled aqueous stimulation fluids.

The treatment fluid used in Test No. 2 (hereinafter "test fluid no. 2"), consisted of about 20 percent by volume methanol, about 80 percent by volume of a solution containing 2% by weight potassium chloride, about 1.0 percent by weight of a coco betaine (a foaming surfactant), about 0.24 percent by weight of an oil based slurry of an aqueous base carboxymethyl hydroxyethyl cellulose (CMHEC) gelling agent, about 0.12 percent by weight of a blend of citric acid and amine compounds (a reducing agent), about 0.07 percent by weight of an enzyme gel breaker, about 0.5 percent by volume of a microemulsion generating component, and about 0.2 percent by volume of a foaming agent component.

The treatment fluid used in Test No. 3 (hereinafter "test fluid no. 3"), consisted of water, about 0.24 percent by weight of a CMHEC gelling agent, about 0.07 percent by weight of an enzyme gel breaker, about 0.5 percent by volume of a microemulsion generating component and about 1 percent by volume of a foaming agent component.

The microemulsion generating component used in the above fluids was the microemulsion generating component preferred for use in the inventive additive, i.e., a microemulsion generating component consisting of (a) about 14.5 percent by volume 2-ethyl hexanol, (b) about 14.5 percent by volume of a microemulsifying agent blend of about 70 percent by weight nonylphenol ethoxylated with approximately 20 moles of ethylene oxide, about 7 percent by weight ethylene glycol, about 5 percent by weight methanol and water, and (c) about 71 percent by volume of a microemulsion mutual solvent/co-solvent blend of about 50 percent by volume ethylene glycol monobutyl ether (EGMBE) and about 50 percent by volume of a mixture of alkyl alcohols having 6 to 7 carbon atoms and ethoxylated with 2 moles of ethylene oxide.

The foaming agent component used in the above fluids was the foaming agent component preferred for use in the inventive additive, i.e., a nonylphenol ethoxylated with about 20 moles of ethylene oxide.

After the Test No. 2 core was saturated with test fluid no 2, its $N_2$ permeability was periodically determined over 72 hours. After the Test No. 3 core was saturated with test fluid no. 3, its $N_2$ permeability was periodically determined over 77 hours.

The initial $N_2$ permeabilities of the cores together with the $N_2$ permeabilities of the cores at subsequent stages of the tests are shown in TABLE II below.

TABLE II

| $N_2$ Endpoint Permeabilty* - Devonian Shale (Test Nos. 2 and 3) | |
|---|---|
| Test Stage | Permeability (Microdarcies) |
| Test No. 2 Core | |
| A) Native State[1] | 12.1 |
| B) After Test Fluid No. 2 (24 hours)[2] | 2.12 |
| Test No. 3 Core | |
| A) Native State[3] | 0.268 |
| B) After Test Fluid No. 3 | 0.306 |

TABLE II-continued

**N₂ Endpoint Permeabilty* - Devonian Shale
(Test Nos. 2 and 3)**

| Test Stage | Permeability (Microdarcies) |
|---|---|
| (18 hours)⁴ | |

*The tests were carried out at a reference upstream gas pressure of 100 psi. The maximum upstream gas pressure during each test was 500 psi.
[1] The initial $N_2$ permeability of the Test No. 2 Core (before saturation with test fluid no. 2)
[2] The $N_2$ permeability of the Test No. 2 Core after 24 hours of $N_2$ flow following saturation with test fluid no. 2.
[3] The initial $N_2$ permeability of the Test No. 3 Core (before saturation with test fluid no. 3).
[4] The $N_2$ permeability of the Test No. 3 Core after 18 hours of $N_2$ flow following saturation with test fluid no. 3.

The above results show that the $N_2$ permeability of the core samples used in Test No. 2 was substantially reduced by test fluid no. 2 indicating that effective gas permeability or end-point relative permeability was significantly reduced from the initial untreated condition. The $N_2$ permeability of the core used in Test No. 3 was not reduced by test fluid no. 3. In fact, after 18 hours of resumed nitrogen gas flow, the $N_2$ permeability of the core used in Test No. 3 was higher than the initial $N_2$ permeability of the core. Thus, the end-point relative permeability to gas had rapidly recovered to its initial value after rapid desaturation of fluid with reverse $N_2$ flow.

Figure 1:
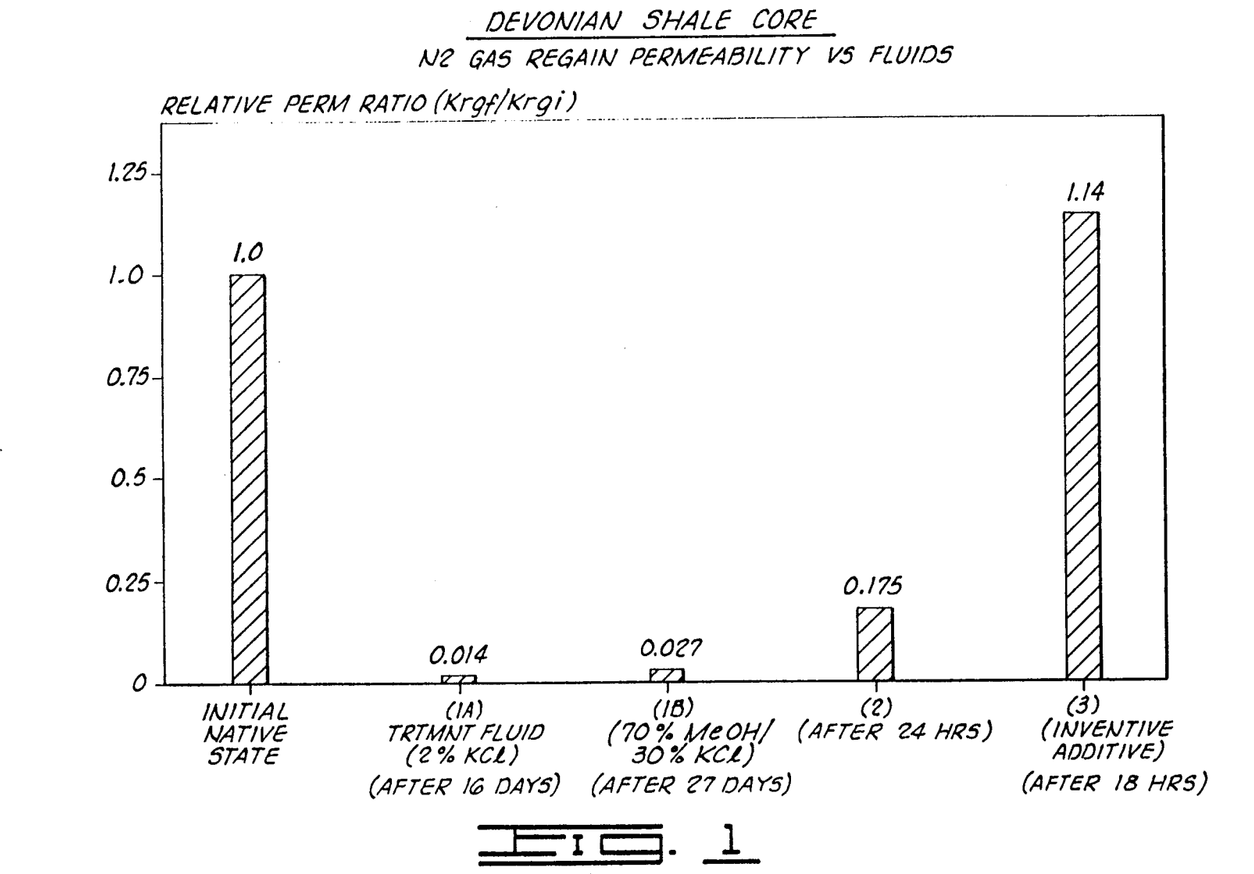
FIG. 1 is a graph corresponding to Example I.

FIG. 1 of the drawings to this application is a graph illustrating the relative permeability ratio of the core samples tested in Test Nos. 1, 2 and 3 above. The relative permeability ratio of each core sample was derived by dividing the $N_2$ permeability of the core after various periods of $N_2$ flow following saturation with the indicated test fluid (Krgf) by the initial $N_2$ permeability of the core (before saturation with the indicated test fluid) (Krgi). The relative permeability ratios illustrate the regain in permeability achieved by the various treatment fluids.

Test No. 4

The core sample used in the fourth test was obtained from a core removed from the formation at a depth of 4,814.6 feet.

The treatment fluid used in Test No. 4 ("test fluid no. 4"), consisted of water, about 2 percent by weight potassium chloride, about 0.5 percent by volume of a microemulsion generating component and about 1 percent by volume of a foaming agent component. The microemulsion generating component and foaming agent component used in test fluid no. 4 were identical to the microemulsion generating component and foaming agent component used in test fluid nos. 2 and 3.

After the core was saturated with test fluid no. 4, the $N_2$ permeability of the core was periodically determined over 2 hours. The test was then terminated. The initial $N_2$ permeability of the core together with the $N_2$ permeability of the core at various stages of the test are shown by TABLE III below.

TABLE III

**N₂ Endpoint Permeability* - Devonian Shale
(Test No. 4)**

| Test State Test No. 4 Core | Permeability (Microdarcies) |
|---|---|
| A) Native State¹ | 26.3 |
| B) After test fluid no. 4 (1 hour) (500 psi)² | 4.62 |
| C) After test fluid no. 4 2 hours) (100 psi)³ | 5.24 |

*The test was carried out at a reference upstream gas pressure of 100 psi. The maximum upstream gas pressure during the test was 300 psi.
[1] The initial $N_2$ permeability of the core (before saturation with test fluid no. 4).
[2] The $N_2$ permeability of the core after 1 hour of $N_2$ flow at 500 psi, a pressure above the reference gas pressure, following saturation with test fluid no. 4.
[3] The $N_2$ permeability of the core after 2 hours at 100 psi, a pressure equal to the reference gas pressure, following saturation with test fluid no. 4.

The results of Test No. 4 show that the inventive additive (about 3 percent by volume of the microemulsion generating component and about 67 percent by volume of the foaming agent component) is effective in non-gelled aqueous treatment fluids. Although the test wa not continued beyond two hours, it was obvious that the permeability of the core would rapidly increase to a high level. This test shows that reasonable desaturation can be obtained during gas production after a very short period of time.

EXAMPLE II

A fracturing job utilizing a gelled foam fracturing fluid was carried out on a Devonian shale gas well in Roane County, West Virginia. The inventive additive was employed in the fracturing fluid.

The particular formation associated with this job had a permeability of less than 1 millidarcy, a porosity of 2 to 3%, a bottom hole pressure of about 800 psi and a bottom hole temperature of about 95° F.

Three zones of the formation were fractured. Prior to fracturing the zones, approximately 750 gallons of an acid breakdown fluid consisting of an aqueous solution containing 15% by volume hydrochloric acid and about 3 gallons of the inventive additive was injected into each zone to break down the perforations, clean up the wellbore and so forth.

The fracturing fluid used was an aqueous solution consisting of about 2% by weight potassium chloride, about 20 pounds per 1,000 gallons of the solution of a CMHEC polymer gelling agent, about 0.15 pounds per 1000 gallons of the solution of an enzyme gelling agent breaker, about 10 gallons per 1000 gallons of the solution of a reducing agent, about 15 gallons per 1000 gallons of the solution of the inventive additive and a sufficient amount of an ammonium salt of an organic acid to adjust the pH of the solution to a value in the range of 4 to 5.

The inventive additive used in the fracturing fluid consisted of approximately 33% by volume of the microemulsion generating component and approximately 67% by volume of the foaming agent component. The microemulsion generating component and foaming agent component were identical to the microemulsion generating component and foaming agent component of the inventive additive as described in Test Nos. 2, 3 and 4 of Example I.

The depth of the formation zones that were fractured ranged from 3,889 to 4,315 feet. The fracturing fluid was pumped into each zone through a 4½ inch tubing string positioned in the wellbore. The fracturing fluid was foamed by adding nitrogen gas to a manifold downstream of the pumping unit. A 90 to 95% quality nitrogen foam was formed. A proppant consisting of 20/40 mesh Ottawa sand was mixed with the fracturing fluid and pumped into the formation therewith.

A total of 80,000 gallons of the fracturing fluid together with about 140,000 pounds of sand were introduced into the formation for the entire job. The zones were fractured sequentially. The fracturing fluid and sand were introduced into the tubing at a rate of about 50 barrels per minute. Once the last zone was fractured, the well was flowed back through a ½ inch choke to recover the fracturing fluid. The fracturing fluid rapidly flowed back from all three zones. The fluid was a foam at the surface indicating a high quality, stable foam had formed.

Samples of the fracturing fluid as it flowed back to the surface were periodically taken beginning after the 1st hour and ending after the 20th hour of flowback. Ga breakthrough was achieved after approximately 24 hours. Following gas breakthrough, the well produced around 250 thousand cubic feet of gas per day. Prior to the fracturing treatment, the well produced around 20 thousand cubic feet of gas per day.

The flowback samples obtained from the job were sent to the laboratory for analysis. The solids and aqueous phases of the samples were separated and independently analyzed.

Mineral species identified within the separated solids portions of the flowback samples included the following, in decreasing overall relative abundance: 1) quartz, 2) illite/mica, 3) kaolinite, 4) chlorite, 5) feldspar and 6) pyrite. Solids loading of the flowback samples ranged from 0.06 weight percent to 0.37 weight percent. $D_{50}$ (median particle diameter) values ranged from 5.2 to 241.1 microns.

The aqueous phases of the samples were first analyzed to determine the soluble mineral compound content and certain physical characteristics thereof. These tests were carried out in accordance with the procedures specified by API RECOMMENDED PRACTICE FOR ANALYSIS OF OIL-FIELD WATER (as revised July 1991). The results of the tests are shown in Table IV below.

TABLE IV

Flowback Water Analysis

| | Sample (hour of flowback)* | | | | | |
|---|---|---|---|---|---|---|
| | 1 | 2 | 3 | 4 | 6 | |
| Specific Gravity @ 70° F. | 1.023 | 1.037 | 1.061 | 1.061 | 1.052 | |
| pH | 3.2 | 3.6 | 2.9 | 3.0 | 3.1 | |
| Resistivity | 0.23 | 0.16 | 0.11 | 0.10 | 0.12 | chm/mm/m** |
| Chlorides (Cl) | 86,066 | 28,239 | 49,130 | 49,580 | 42,483 | mpl*** |
| Sulfate (SO$_4$) | 129 | 213 | 272 | 278 | 208 | mpl*** |
| Barium (Ba) | <5 | <5 | <5 | <5 | <5 | mpl*** |
| Calcium (Ca) | 1,893 | 3,786 | 6,630 | 7,170 | 6,235 | mpl*** |
| Magnesium (Mg) | 305 | 481 | 1,432 | 443 | 872 | mpl*** |
| Sodium (Na) | 5,100 | 11,000 | 15,000 | 17,000 | 14,000 | mpl*** |
| Potassium (K) | 5,600 | 3,800 | 2,800 | 2,900 | 3,300 | mpl*** |
| Iron (Fe) | 545 | 828 | 2,871 | 2,891 | 2,151 | mpl*** |
| | Sample (hour of flowback)* | | | | | |
| | 8 | 10 | 12 | 16 | 20 | |
| Specific Gravity @ | 1.053 | 1.053 | 1.053 | 1.103 | 1.105 | |

TABLE IV-continued

Flowback Water Analysis

| 70° F. | | | | | | |
|---|---|---|---|---|---|---|
| pH | 3.2 | 3.2 | 3.0 | 3.6 | 3.6 | |
| Resistivity | 0.12 | 0.12 | 0.11 | 0.07 | 0.07 | chm/mm/m** |
| Chlorides (Cl) | 41,483 | 41,483 | 41,533 | 86,465 | 86,815 | mpl*** |
| Sulfate (SO$_4$) | 200 | 204 | 208 | 308 | 300 | mpl*** |
| Barium (Ba) | <5 | <5 | <5 | <5 | <5 | mpl*** |
| Calcium (Ca) | 6,031 | 6,475 | 6,115 | 20,263 | 17,889 | mpl*** |
| Magnesium (Mg) | 865 | 712 | 945 | 654 | 632 | mpl*** |
| Sodium (Na) | 13,000 | 14,000 | 18,000 | 27,000 | 26,000 | mpl*** |
| Potassium (K) | 3,300 | 3,300 | 3,600 | 2,030 | 1,950 | mpl*** |
| Iron (Fe) | 2,120 | 2,140 | 2,125 | 4,785 | 4,836 | mpl*** |

*The number of the sample is the time (hours after flowback started) the sample was taken.
**Ohms per square meter per meter.
***Milligrams per liter.

Next, the aqueous phases of the samples were analyzed to determine the concentration of the inventive additive therein. The concentration of the inventive additive in the samples was determined by identifying and measuring the amount of nonylphenol ethoxylated with 20 moles of ethylene oxide therein. Each sample was analyzed in accordance with the following procedure: Ten mls of distilled 1,2-dichloroethane were placed in a 30 ml separatory funnel. Five mls of a reagent consisting of a cobalt thiocyanate complex were then added to the 1,2-dichloroethane. One ml of the sample was then added to this mixture. The contents of the mixture were agitated for approximately 1 minute and allowed to stand for approximately 5 minutes. The contents separated into an aqueous layer and a chlorated hydrocarbon organic layer. A portion of the organic layer was withdrawn and kept in a stoppered vial overnight to allow for complete separation. This yielded a clear, blue solution. A blank solution was then prepared by the same procedure utilizing 1.0 ml of distilled water in place of the sample. The reagent was prepared by dissolving 20 grams of ammonium thiocyanate in about 70 mls of distilled water, adding 3 grams of cobalt nitrate hexahydrate thereto and diluting the entire mixture to 100 ml.

The blank solution was then transferred to a 10 mm pathlength cuvette using a 5 ml syringe. A photospectrometer was used to obtain absorption values of the blank. The same procedure was then utilized to obtain absorption values of the clear, blue solution of the sample. These values were normalized to known concentration blanks over the range of detection and converted to total volume percent of the inventive additive present in the sample. The blank was remeasured at the conclusion of the measurements to correct for instrument drift, if any. The results of the tests are shown in Table V below.

TABLE V

Concentration of Inventive Additive in Flowback Samples

| Sample No. | Concentration of Inventive Additive (Vol. %)* |
|---|---|
| 1st hour flowback | 0.60 |
| 2nd hour flowback | 0.54 |
| 3rd hour flowback | 0.38 |

TABLE V-continued

Concentration of Inventive Additive in Flowback Samples

| Sample No. | Concentration of Inventive Additive (Vol. %)* |
|---|---|
| 4th hour flowback | 0.44 |
| 6th hour flowback | 0.42 |
| 8th hour flowback | 0.44 |
| 10th hour flowback | 0.46 |
| 12th hour flowback | 0.43 |
| 16th hour flowback | 0.09 |
| 20th hour flowback | N.D.** |

Figure 2:
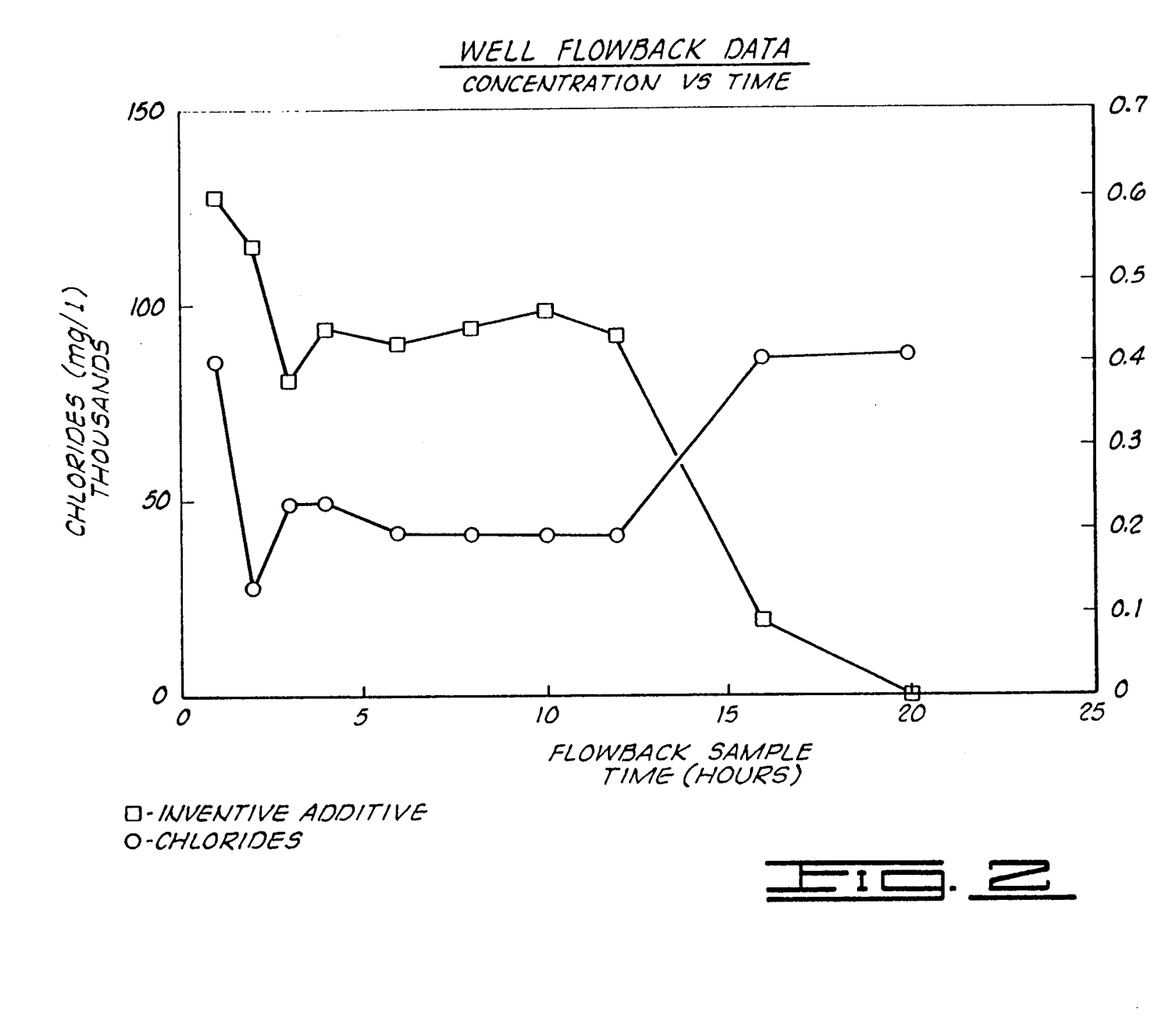
FIG. 2 is a graph corresponding to Example II.

*Percent by volume of the inventive additive based on the total volume of the sample.
**None detected A graph in which both the total concentration of chloride ions and total concentration of the inventive additive present in the samples is plotted against the time the samples were taken (flowback time) is presented in FIG. 2 of the drawings of this application. This graph displays a "mirror image" of the data which represents the point when the fracturing fluid "load recovery" was obtained. This point occurs approximately where the plotted lines overlap, which corresponds to about the 13th hour of flowback. After the 13th hour of flowback, a rapid decrease in the concentration of the inventive additive and a rapid increase in the concentration of total chlorides present in the flowback occurred. The rapid decrease in the concentration of the inventive additive (none detected after 20 hours) shows that the fracturing fluid was essentially recovered at this point. The rapid increase in chlorides resulted from inflow of formation brine following recovery of the fracturing fluid.

To check the validity of the measured total chloride values with respect to associated cations present, calculated total chloride values based on a mass balance of the associated total cations were compared to the measured total chloride values shown in FIG. 3. The calculated chloride values corresponded very well to the measured chloride values, indicating stoichiometry.

Thus, the laboratory analyses confirmed the effectiveness of the inventive additive.

EXAMPLE III

A foam fracturing job utilizing the inventive additive was carried out on a well in a coal bed methane formation in Dickenson County, Vir. Coal bed methane formations are generally characterized by extremely low matrix permeabilities and a "fractured" cleat system of high permeabilities. These formations must typically be desaturated of connate water from the cleat system before economic gas production rates can be sustained.

The particular coal bed methane formation associated with this job had a permeability of about 12 millidarcy and a porosity of about 4%. The bottom hole temperature was about 75° F.

The fracturing job included the use of four treatment fluids, an acid breakdown fluid, a prepad fluid, a pad fluid and a sand laden fracturing fluid. The inventive additive was used in each of these fluids at a concentration of 4 gallons per 1,000 gallons of the fluid.

The inventive additive utilized in the fluids consisted of approximately 40% by volume of the microemulsion generating component and approximately 60% by volume of the foaming agent component. The microemulsion generating component and foaming agent component were identical to the microemulsion generating component and foaming agent component used in Test Nos. 2, 3 and 4 of EXAMPLE I.

The treatment fluids were pumped into the formation through a 4 ½ inch tubing string positioned in the well bore.

The acid breakdown fluid was pumped into the formation to clean up the portion of the formation directly adjacent to the well bore. The acid breakdown fluid consisted of 750 gallons of an aqueous solution containing 15% by weight hydrochloric acid plus 3 gallons of the inventive additive followed by 1,000 gallons of water together with 4 gallons of the inventive additive and 0.75 gallon of an acid corrosion inhibitor.

Next, a prepad fluid consisting of 700 gallons of an aqueous solution containing 15% by weight hydrochloric acid, 2.8 gallons of the inventive additive, and 0.7 gallon of an acid corrosion inhibitor was pumped into the formation. To insure fluid was pumped into all perforations, 30 rubber coated nylon ball sealers (⅞ inch) were seated on the perforations. The prepad fluid was used to open up the perforations and to remove near wellbore damage.

A foamed pad fluid consisting of 8,400 gallons of a fresh water solution containing 33.6 gallons of the inventive additive was then pumped into the formation at a rate of 50 barrels per minute. The water and inventive additive were admixed in a blender. The foam was generated by injecting nitrogen gas downstream of the blender through a ground manifold. A 70% quality nitrogen foam was formed. The formation was fractured by the foamed pad fluid.

Immediately after the pad fluid was introduced, a foam fracturing fluid consisting of fresh water and the inventive additive was introduced into the formation together with increasing quantities of a proppant comprising 20/40 mesh sand. A total of 67,200 gallons of fresh water, 268.8 gallons of the inventive additive and about 67,500 pounds of sand were used. The fracturing fluid was foamed by injecting nitrogen, downstream of the blender used to admix the water, inventive additive and sand, into a ground manifold. The fluid was then pumped into the well. Sand was added to the blender tub through sand screws on the blender unit. The fracturing fluid was introduced to the well at a rate of 50 to 70 barrels per minute.

Thereafter, the casing was flushed with 110 barrels of a 70% quality foam at a rate of 21 barrels per minute. The well was shut in for about 1 hour and then flowed back to the surface holding pit through a ½ inch choke to recover the treatment fluids used in the fracturing job from the formation.

Use of the inventive additive increased the rate of fluid recovery by almost 100%. Upon gauging the flow back tanks, it was determined that the well was flowing 180 barrels of the fluids for the first 4 hours and 275 to 30 barrels of the fluids within 18 hours. Other wells fractured in the same way without using the inventive additive only flowed approximately 150 barrels of fluid after 18 hours.

It is interesting to note that acid from the breakdown fluid flowed back even though nitrogen was not used therewith. Foam that flowed back was of very high quality indicating that a high quality, stable foam was formed. Gas breakthrough was achieved shortly after the fracturing job was complete.

A second foam fracturing job was carried out on a similar well in the same manner as the job described above, except a different foaming agent component was substituted for the foaming agent component of the inventive additive. The foaming agent component combined with the microemulsion generating component of the additive used in this job was a coco betaine, an amphoteric surfactant. It was determined that the additive used in this job did not speed up the rate of fluid recovery.

EXAMPLE IV

A foamed acidizing job utilizing the inventive additive was carried out on a well in a carbonate formation in Divide County, North Dakota. Carbonate formations are generally composed predominantly of the minerals calcite ($CaCO_3$) and/or dolomite ($CaMg(CO_3)_2$). These minerals are highly soluble in mineral acids such as hydrochloric acid (HCl).

The particular carbonate formation associated with this job had a permeability of 1 to 3 millidarcy and a porosity of about 5 to 10%. The bottom hole temperature was about 195° F.

The foamed acidizing job included the use of four treatment fluids, a nitrogen breakdown, a xylene spacer, a foamed acid, and a nitrogen gas flush. The inventive additive was used in the foamed acid portion of the job at a concentration of 6 gallons per 1000 gallons of the fluid.

The inventive additive utilized in the fluids consisted of approximately 33% by volume of the microemulsion generating component and approximately 67% by volume of the foaming agent component. The microemulsion generating component and foaming agent component were identical to the microemulsion generating component and foaming agent component used in Test Nos. 2, 3 and 4 of Example I. The treatment fluids were pumped into the formation through a 2 ½ inch tubing string positioned in the wellbore.

The nitrogen breakdown (prepad), comprising 50,000 standard cubic feet of gas, was pumped first into the formation. The prepad fluid was used to open up the perforations and make sure that the formation was capable of accepting fluid.

The xylene spacer, a spacer fluid consisting of 168 gallons of xylene, was then utilized to clean the tubulars. The spacer was also utilized to maintain separation between the prepad and acidizing fluids so that the heavier fluid does not bypass the lighter fluid.

The foamed acid fluid consisted of about 3150 gallons of an aqueous solution containing 28% hydrochloric acid, 18.9 gallons of an acid corrosion inhibitor, 9.45 gallons of a non-emulsifier, 18.9 gallons of the inventive additive, 157 pounds of an iron control additive, 15.75 gallons of a sulfide control additive and 15.75 gallons of an acid gelling agent. The foam was generated by injecting nitrogen gas downstream of the blending unit through a ground manifold. A 65% quality nitrogen foam was formed. The formation was treated at a matrix rate of approximately two barrels per minute.

Thereafter, the well was flushed with 57,000 standard cubic feet of nitrogen gas at rates of approximately two barrel equivalent liquid rate. The well was shut in for an instantaneous shut in pressure and also 5, 10 and 15 minute shut in pressures.

The well was then flowed back to surface with a variable choke holding back pressure on the reservoir to recover the treatment fluids from the formation.

Use of the inventive additive increased the rate and volume of fluid recovery. Upon gauging the flow back, it was determined that 100% of the fluid pumped was recovered. Other wells in the area stimulated in the same way without using the inventive additive did not produce any fluid back without extensive swabbing operations.

EXAMPLE V

A low permeability sandstone gas producing formation in Uinta County, Wyoming was treated to remove formation damage and reverse loss in gas production due to trapped fluids in the formation. Both brine and gas condensate fluids were lost to the formation.

The formation was originally producing at a rate of 5.2 million cubic feet of gas per day, 32 barrels per day condensate and 11 barrels per day formation water. The well contained perforations from 13,040 to 13,068 feet below surface in the producing interval. Bottom hole temperature was 252° F. The formation was tested originally as having a permeability of 2.87 millidarcy and a porosity of 10.74%. Because the zone was from a partially pressure depleted reservoir, the bottom hole pressure was 2,862 psi, substantially lower than the original native reservoir pressure which ranged from approximately 5,000 to 10,000 psi in the field prior to depletion.

A hole in the tubing had resulted in extensive well workover which required the operator to fill the wellbore with "kill" fluids consisting of weighted KCl brine and gas condensate. The fluids invaded the formation due to hydrostatic fluid pressure during the workover operation.

Following the workover operation, the well was unloaded with nitrogen gas to relieve the hydrostatic fluid pressure in the wellbore. Thereafter, the well would only produce at a rate of 300 thousand to 400 thousand cubic feet of gas per day. It was determined that the well had experienced an extensive loss of near well bore permeability which resulted in formation damage with a skin factor of (+) 45. A skin factor of zero indicates a non-damaged well.

A first attempt was made by the operator to remove the damage due to trapped fluids or "fluid blocks". In this attempt, approximately 40 tons of plain carbon dioxide with no additives were pumped. Following treatment, the well produced at 800 thousand cubic feet of gas per day. The well was flowed for 40 days with no additional clean-up or change in production rate. The well was then re-perforated and a second carbon dioxide treatment performed which was the same as the first. Following the second treatment, the well produced at a rate of 1.4 million cubic feet of gas per day.

Because the well was only producing at a rate which was approximately 27 percent of the original production rate, an additional treatment incorporating the inventive additive was performed. This treatment was carried out by pumping into the formation 15,000 gallons of carbon dioxide foam consisting of approximately 2,250 gallons of an aqueous phase. The aqueous phase contained a total of 52 gallons of the inventive additive; 225 gallons of methanol (gel stabilizer); 20 pounds of a gel pH buffering agent; 10 gallons of an organic clay stabilizer; 14 gallons of an oil based slurry of an aqueous based CMHPG polymer gel and 1 gallon of a bactericide. The treatment fluid was pumped into the formation at a rate of 10 barrels per minute. The foam was generated by injecting carbon dioxide through a $CO_2$ booster pump and pumping unit into a surface manifold with the treatment fluid. An 85% quality carbon dioxide foam was formed. An overflush fluid consisting of 5000 gallons of isopropyl alcohol with no additives was pumped following the main treatment for displacement and overdisplacement purposes.

The well was then shut in for about 1 hour. Thereafter, the well was flowed back to surface through a variable choke to recover treatment fluids from the formation.

Use of the inventive additive brought well production up to a rate of 4.7 million cubic feet of gas per day at a line pressure of 750 psi. Thus, approximately 90% of the original undamaged production of the well was recovered, with an improvement of about 64% over the previous treatment attempts.

The preceding examples can be repeated with similar success by substituting the generically or specifically described reactants and/or operating conditions of this invention for those used in the examples.

Although certain preferred embodiments of the invention have been described for illustrative purposes, it will be appreciated that various modifications and innovations of the compositions and method recited herein may be effected without departure from the basic principals which underlie the invention. Changes of this type are therefore deemed to lie within the spirit and scope of the invention except as may be necessarily limited by the inventive claims and reasonable equivalents thereof.

What is claimed is:

1. A method of treating a subterranean formation to increase the production of gas therefrom comprising:
   contacting said formation with a water external microemulsion foam well treatment composition, said well treatment composition including:
   (a) about 90% to about 99.95% by volume of a treatment fluid selected from the group consisting of an aqueous acid solution and an aqueous non-acid solution;
   (b) about 0.0125% to about 5% by volume of a microemulsion generating component for enhancing the ability of said well treatment composition to be recovered from said formation, said microemulsion generating component including:
      (i) an alkyl alcohol having in the range of from 4 to 18 carbon atoms microemulsified into said treatment fluid;
      (ii) a microemulsifying agent present in an amount sufficient to form and maintain a stable microemulsified dispersion of said alcohol in said treatment fluid;
      (iii) a microemulsion mutual solvent selected from the group consisting of glycol ethers and alkoxylates of glycol ethers; and
      (iv) a microemulsion co-solvent selected from the group consisting of polyethylene glycol, primary alcohols and alkyoxylates of alkyl alcohols, each of said components (i)-(iv) being different compounds or different mixtures of compounds;
   (c) a gas component; and
   (d) about 0.025% to about 7.5% by volume of a foaming agent component for generating a foam in the presence of said treatment fluid and said gas component and enhancing the ability of said well treatment composition to be recovered from said formation, said foaming agent component including at least one nonionic surface active agent having a HLB of from 12 to 22, each of said components (a)-(d) being different compounds or different mixtures of compounds; and
   recovering said well treatment composition from said formation.

2. The method of claim 1 wherein said well treatment composition comprises about 98% to about 99.9% by volume of said treatment fluid, about 0.025% to about 1% by volume of said microemulsion generating component and about 0.05% to about 1.5% by volume of said foaming agent component.

3. The method of claim 1 wherein said microemulsifying agent of said microemulsion generating component of said well treatment composition is selected from the group consisting of ethoxylated alcohols, esters, alkyl sulfonates, alkyl phosphates, carboxylated-ethoxylated tallow amines, betaine compounds and mixtures thereof.

4. The method of claim 3 wherein said microemulsifying agent is an ethoxylated nonylphenol.

5. The method of claim 1 wherein said foaming agent component of said well treatment composition includes at least one compound selected from the group consisting of alkyloxylated nonylphenols, alkyoxylated linear alcohols, alkyoxylated branched chain alcohols and propylene oxide condensate block copolymers.

6. The method of claim 5 wherein said foaming agent component is a nonylphenol ethoxylated with in the range of about 15 moles to about 100 moles of ethylene oxide.

7. The method of claim 1 wherein said gas component of said well treatment composition is selected from the group consisting of nitrogen, and carbon dioxide, and mixtures thereof.

8. The method of claim 1 wherein said treatment fluid of said well treatment composition is a base fracturing fluid selected from the group consisting of ammonium chloride solutions, calcium chloride solutions, potassium chloride solutions and salt substitute solutions.

9. The method of claim 1 wherein said well treatment composition further comprises at least one additional component selected from the group consisting of gelling agents and proppant materials, said additional component(s) consisting of different compounds or mixtures of compounds than said components (a)-(d) of said well treatment composition.

10. The method of claim 1 wherein said microemulsion mutual solvent of said microemulsion generating component of said well treatment composition is a glycol ether.

11. The method of claim 10 wherein said microemulsion mutual solvent is ethylene glycol monobutyl ether.

12. The method of claim 1 wherein said microemulsion cosolvent of said microemulsion generating component of said well treatment composition is selected from the group consisting of an alkyl alcohol having 6 carbon atoms and an alkyl alcohol having 7 carbon atoms, said alkyl alcohol being ethoxylated with two moles of ethylene oxide.

13. The method of claim 12 wherein said microemulsion cosolvent is an alkyl alcohol having 7 carbon atoms and ethoxylated with two moles of ethylene oxide.

14. The method of claim 1 wherein said microemulsion generating component of said well treatment composition includes in the range of from about 5% to about 25% by volume of said alkyl alcohol, in the range of from about 1% to about 25% by volume of said microemulsifying agent, in the range of from about 20% to about 50% by volume of said microemulsion mutual solvent, and in the range of from about 20% to about 50% by volume of said microemulsion co-solvent.

15. The method of claim 14 wherein said microemulsion generating component includes in the range of from about 10% to about 18% by volume of said alkyl alcohol, in the range of from about 10% to about 18% by volume of said microemulsifying agent, in the range of from about 32% to about 40% by volume of said microemulsion mutual solvent, and in the range of from about 32% to about 40% by volume of said microemulsion co-solvent.

16. In a method of fracturing a subterranean formation having a low permeability to increase the production of gas therefrom wherein a foam fracturing fluid containing an aqueous base fracturing fluid, a gas component and a foaming agent component for generating a foam in associated with the base fracturing fluid and gas component is used to fracture the formation and then recovered from the formation, the improvement comprising employing as said foaming agent component a micellar foaming agent whereby the ability of said foam fracturing fluid to be recovered from said formation is enhanced, said micellar foaming agent comprising:
(a) about 25% to about 50% by volume of a microemulsion generating component which forms a water external microemulsion when added to the base fracturing fluid and enhances the ability of said foam fracturing fluid to be recovered form said formation, said microemulsion generating component including:
  (i) an alkyl alcohol having in the range of from 4 to 18 carbon atoms;
  (ii) a microemulsifying agent present in an amount sufficient to form and maintain a stable microemulsified dispersion of said alkyl alcohol in the water external phase of said microemulsion;
  (iii) a microemulsion mutual solvent selected from the group consisting of glycol ethers; and
  (iv) a microemulsion co-solvent selected from the group consisting of polyethylene glycol, primary alcohols and alkyoxylates of alkyl alcohols, each of said components (i)–(iv) being different compounds or different mixtures of compounds; and
(b) about 50% to about 75% by volume of a foaming agent component for generating a foam in the presence of said base fracturing fluid and said gas component and enhancing the ability of said foam fracturing fluid to be recovered from said formation, said foaming agent component including at least one nonionic surface active agent having a HLB of from 12 to 22, whereby if said foaming agent component consists of a mixture of compounds, it is a different mixture of compounds than said mixture of compounds forming said microemulsion generating component.

17. The method of claim 16 wherein said micellar foaming agent comprises about 25% to about 33% by volume of said microemulsion generating component and about 67% to about 75% by volume of said foaming agent component.

18. The method of claim 17 wherein said micellar foaming agent comprises about 33% by volume of said microemulsion generating component and about 67% by volume of said foaming agent component.

19. The method of claim 16 wherein said microemulsifying agent of said microemulsion generating component of said micellar foaming agent is selected from the group consisting of ethoxylated alcohols, esters, alkyl sulfonates, alkyl phosphates, carboxylatedethoxylated tallow amines, betaine compounds and mixtures thereof.

20. The method of claim 19 wherein said microemulsifying agent is an ethoxylated nonylphenol.

21. The method of claim 16 wherein said microemulsion mutual solvent of said microemulsion generating component of said micellar foaming agent is a glycol ether.

22. The method of claim 21 wherein said microemulsion mutual solvent is ethylene glycol monobutyl ether.

23. The method of claim 16 wherein said microemulsion co-solvent of said microemulsion generating component of said micellar foaming agent is selected from the group consisting of an alkyl alcohol having 6 carbon atoms and an alkyl alcohol having 7 carbon atoms, said alkyl alcohol being ethoxylated with two moles of ethylene oxide.

24. The method of claim 23 wherein said microemulsion co-solvent is an alkyl alcohol having 7 carbon atoms and ethoxylated with two moles of ethylene oxide.

25. The method of claim 16 wherein said microemulsion generating component of said micellar foaming agent comprises in the range of from about 5% to about 25% by volume of said alkyl alcohol, in the range of from about 1% to bout 25% by volume of said microemulsifying agent, in the range of from about 20% to about 50% by volume of said microemulsion mutual solvent, and in the range of from about 20% to about 50% by volume of said microemulsion co-solvent.

26. The method of claim 25 wherein said microemulsion generating component comprises in the range of from about 10% to about 18% by volume of said alkyl alcohol, in the range of from about 10% to about 18% by volume of said microemulsifying agent, in the range of from about 32% to about 40% by volume of said microemulsion mutual solvent, and in the range of from about 32% to about 40% by volume of said microemulsion co-solvent.

27. The method of claim 16 wherein said foaming agent component of said micellar foaming agent includes at least one compound selected from the group consisting of alkyoxylated nonylphenols, alkyoxylated linear alcohols, alkyoxylated branched chain alcohols and propylene oxide condensate block copolymers.

28. The method of claim 27 wherein said foaming agent component is a nonylphenol ethoxylated with in the range of about 15 moles to about 100 moles of ethylene oxide.

29. A method of displacing blocks of water and other connate fluids interlocked with gas in a subterranean formation to increase the production of gas from the subterranean formation comprising:
contacting said formation with a water external microemulsion well treatment composition, said well treatment composition including:
  (a) about 90% to about 99.95% by volume of a treatment fluid selected from the group consisting of an aqueous acid solution and an aqueous non-acid solution;
  (b) about 0.0125% to about 5% by volume of a microemulsion generating component said microemulsion generating component including:
    (i) an alkyl alcohol having in the range of from 4 to 18 carbon atoms microemulsified into said treatment fluid;
    (ii) a microemulsifying agent present in an amount sufficient to form and maintain a stable microemulsified dispersion of said alcohol in said treatment fluid;

(iii) a microemulsion mutual solvent selected from the group consisting of glycol ethers and alkyoxylates of glycol ethers; and
(iv) a microemulsion co-solvent selected from the group consisting of polyethylene glycol, primary alcohols and alkyoxylates of alkyl alcohols, each of said components (i)–(iv) being different compounds or different mixtures of compounds;
(c) about 0.025% to about 7.5% by volume of a foaming agent component, said foaming agent component including at least one non-ionic surface active agent having a HLB of from 12 to 22, each of said components (a)–(c) being different compounds or different mixtures of compounds; and
recovering said well treatment composition from said formation.

30. The method of claim 29 wherein said well treatment composition comprises about 98% to about 99.9% by volume of said treatment fluid, about 0.025% to about 1% by volume of said microemulsion generating component and about 0.05% to about 1.5% by volume of said foaming agent component.

31. The method of claim 29 wherein said microemulsifying agent of said microemulsion generating component of said well treatment composition is selected from the group consisting of ethoxylated alcohols, esters, alkyl sulfonates, alkyl phosphates, carboxylated-ethoxylated tallow amines, betaine compounds and mixtures thereof.

32. The method of claim 31 wherein said microemulsifying agent is an ethoxylated nonylphenol.

33. The method of claim 29 wherein said foaming agent component of said well treatment composition includes at least one compound selected from the group consisting of alkyoxylated nonylphenols, alkyoxylated linear alcohols, alkyoxylated branches chain alcohols and propylene oxide condensate block copolymers.

34. The method of claim 33 wherein said foaming agent component is a nonylphenol ethoxylated with in the range of about 15 moles to about 100 moles of ethylene oxide.

35. The method of claim 29 wherein said well treatment composition further comprises a gas component, and said foaming agent component of said treatment composition functions to generate a foam in associated with said treatment fluid and said gas component.

36. The method of claim 29 wherein said microemulsion mutual solvent of said microemulsion generating component of said well treatment composition is a glycol ether.

37. The method of claim 36 wherein said microemulsion mutual solvent is ethylene glycol monobutyl ether.

38. The method of claim 29 wherein said microemulsion cosolvent of said microemulsion generating component of said well treatment composition is selected from the group consisting of an alkyl alcohol having 6 carbon atoms and an alkyl alcohol having 7 carbon atoms, said alkyl alcohol being ethoxylated with two moles of ethylene oxide.

39. The method of claim 38 wherein said microemulsion cosolvent is an alkyl alcohol having 7 carbon atoms and ethoxylated with two moles of ethylene oxide.

40. The method of claim 29 wherein said microemulsion generating component of said well treatment composition includes in the range of from about 5% to about 25% by volume of said alkyl alcohol, in the range of from about 1% to about 25% by volume of said microemulsifying agent, in the range of from about 20% to about 50% by volume of said microemulsion mutual solvent, and in the range of from about 20% to about 50% by volume of said microemulsion co-solvent.

* * * * *